United States Patent
Hsu

(10) Patent No.: US 11,660,984 B2
(45) Date of Patent: May 30, 2023

(54) HARDNESS ADJUSTMENT UNIT, SEAT, AND SEAT ADJUSTMENT SYSTEM

(71) Applicant: Foxtron Vehicle Technologies Co., Ltd., New Taipei (TW)

(72) Inventor: Chia-Hao Hsu, New Taipei (TW)

(73) Assignee: Foxtron Vehicle Technologies Co., Ltd., New Taipei (TW)

( * ) Notice: Subject to any disclaimer, the term of this patent is extended or adjusted under 35 U.S.C. 154(b) by 114 days.

(21) Appl. No.: 17/218,522

(22) Filed: Mar. 31, 2021

(65) Prior Publication Data
US 2022/0203868 A1    Jun. 30, 2022

(30) Foreign Application Priority Data

Dec. 31, 2020  (CN) .......................... 202011620802.4

(51) Int. Cl.
*B60N 2/02* (2006.01)
*A47C 7/14* (2006.01)

(52) U.S. Cl.
CPC ............ *B60N 2/0244* (2013.01); *A47C 7/142* (2018.08); *B60N 2002/026* (2013.01); *B60N 2002/0268* (2013.01)

(58) Field of Classification Search
CPC ............. B60N 2/646; B60N 2002/026; B60N 2002/0268; B60N 2002/924; B60N 2/4279; B60N 2/0244; A47C 7/142
See application file for complete search history.

(56) References Cited

U.S. PATENT DOCUMENTS

| | | | |
|---|---|---|---|
| 9,283,875 B1* | 3/2016 | Pellettiere | B60N 2/42727 |
| 2005/0258090 A1* | 11/2005 | Gernon | F16F 9/53 |
| | | | 252/570 |
| 2010/0132120 A1* | 6/2010 | Koerlin | A61G 5/1043 |
| | | | 5/654 |
| 2013/0186473 A1* | 7/2013 | Mankame | F15B 21/065 |
| | | | 137/13 |
| 2015/0197173 A1* | 7/2015 | Hulway | B60N 2/99 |
| | | | 297/452.49 |

FOREIGN PATENT DOCUMENTS

| | | |
|---|---|---|
| CN | 101472761 A | 7/2009 |
| CN | 103448583 A | 12/2013 |
| DE | 102006032891 A1 | 1/2008 |

* cited by examiner

*Primary Examiner* — Sarah B Mcpartlin
(74) *Attorney, Agent, or Firm* — ScienBiziP, P.C.

(57) ABSTRACT

A hardness adjustment unit includes an elastic frame, a barrier, and a field generator. An enclosed space is provided inside the elastic frame and filled with a fluid filling. The barrier is arranged in the enclosed space and divides the enclosed space into an upper space and a lower space. The upper space communicates with the lower space. The field generator is arranged outside the elastic frame and used to apply a field to the fluid filling to adjust a viscosity of the fluid filling, thereby adjusting a flow damping of the fluid filling in the upper space and the lower space to control a deformation of the elastic frame.

15 Claims, 7 Drawing Sheets

HARDNESS ADJUSTMENT UNIT, SEAT, AND SEAT ADJUSTMENT SYSTEM

FIELD

The subject matter herein generally relates to a hardness adjustment unit, a seat having the hardness adjustment unit, and a seat adjustment system for controlling the hardness adjustment unit.

BACKGROUND

A hardness of a seat in a vehicle is generally fixed. When the vehicle encounters various driving conditions, the fixed hardness of the seat may cause discomfort to a passenger. Furthermore, the hardness of the seat may not be suitable for some passengers with disabilities.

BRIEF DESCRIPTION OF THE DRAWINGS

Implementations of the present disclosure will now be described, by way of embodiments, with reference to the attached figures.

DETAILED DESCRIPTION

Figure 1:
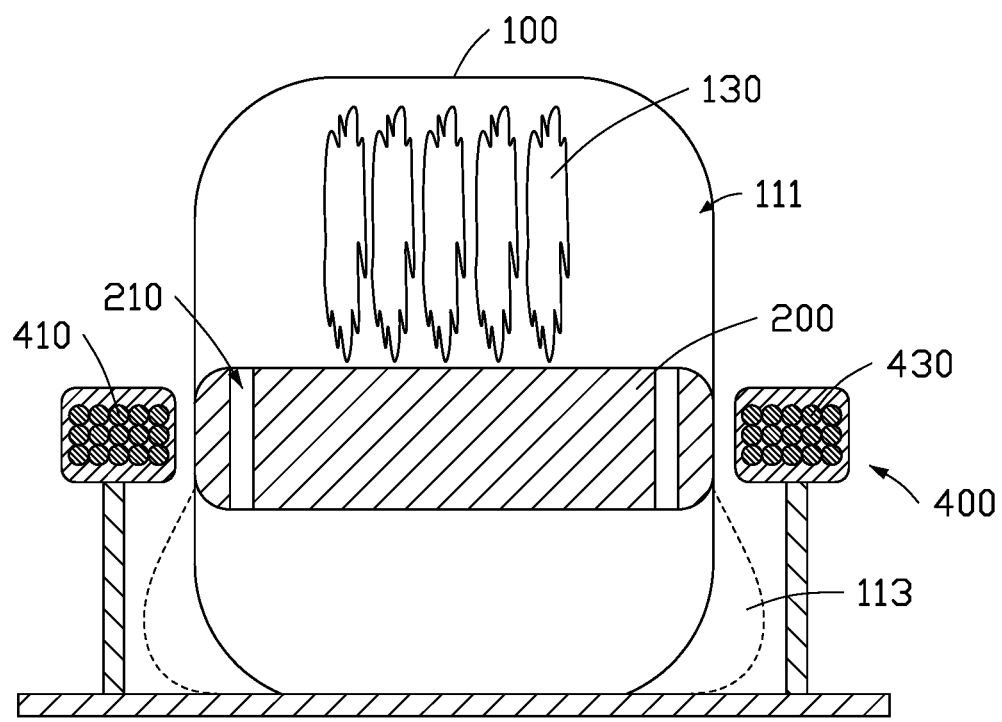
FIG. 1 is a cross-sectional view of a hardness adjustment unit according to a first embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

Figure 2:
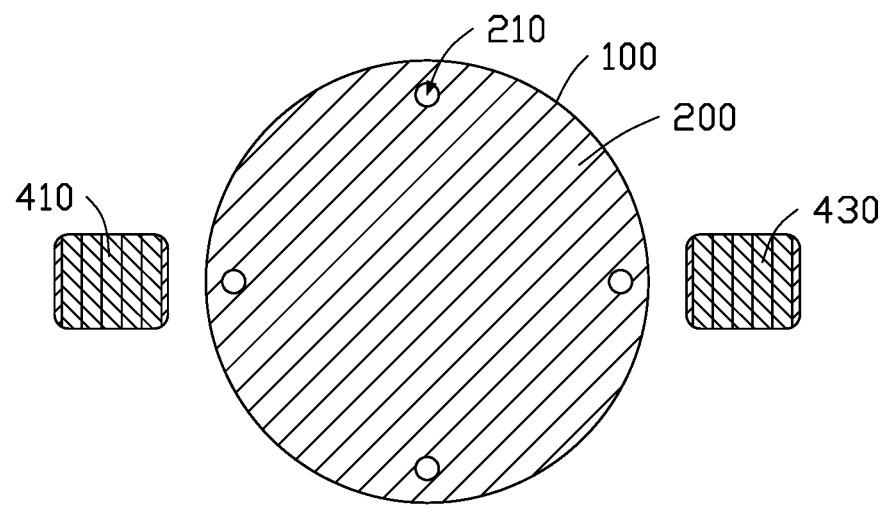
FIG. 2 is a top view of the hardness adjustment unit in FIG. 1.

FIG. 1 and FIG. 2, show a first embodiment of a hardness adjustment unit 010 for adjusting a softness and hardness of a seat. The hardness adjustment unit 010 includes an elastic frame 100, a barrier 200, a fluid filling, and a field generator 400. An enclosed space 110 is provided in the elastic frame 100. The barrier 200 is arranged in the enclosed space 110 and divides the enclosed space 110 into an upper space 111 and a lower space 113. The upper space 111 is in communication with the lower space 113. The fluid filling is filled in the enclosed space 110. The field generator 400 is arranged outside the elastic frame 100 and used to apply a field to the fluid filling to adjust a viscosity of the fluid filling, thereby adjusting a flow damping of the fluid filling in the upper space 111 and the lower space 113 to control a deformation of the elastic frame 100.

A cushioning capacity of the elastic frame 100 can be adjusted by the flow damping of the fluid filling, thereby controlling the softness and hardness of the elastic frame 100. Interaction between the barrier 200 and the elastic frame 100 can support and maintain an overall structure of the hardness adjustment unit 010, so that the hardness adjustment unit 010 will not suddenly collapse when bearing weight, so as to provide a good softness and hardness adjusting effect.

The communication between the upper space 111 and the lower space 113 is achieved by a plurality of circulation holes 210 provided on the barrier 200. By changing a size and number of the circulation holes 210, a circulation of the fluid filling having a constant viscosity between the upper space 111 and the lower space 111 can be controlled. In order to make the circulation of the fluid filling in each area of the barrier 200 as uniform as possible, the circulation holes 210 are evenly distributed on the barrier 200.

In one embodiment, a number of the circulation holes 210 is four, the four circulation holes 210 are respectively distributed near four edges of the barrier 200, and connecting lines through centers of the circulation holes 210 form a rhombus. In other embodiments, the number, shape, and distribution of the circulation holes 210 can be different. In another embodiment, the circulation holes 210 may be replaced by pipes to realize communication between the upper space 111 and the lower space 113.

In one embodiment, the fluid filling is a magnetorheological fluid, and the field generated by the field generator 400 is a magnetic field. In order to uniformly adjust the viscosity of the magnetorheological fluid, the field generator 400 includes a first magnetic field line 410 and a second magnetic field line 430. The first magnetic field line 410 and the second magnetic field line 430 are symmetrically arranged on two sides of the elastic frame 100. The first magnetic field line 410 and the second magnetic field line 430 generate a symmetrical magnetic field to act on the magnetorheological fluid.

In another embodiment, the fluid filling may be an electrorheological fluid, and the field generator 400 generates an electric field to act on the electrorheological fluid.

In order to maintain the barrier 200 in a substantially middle position in the elastic frame 100, a traction member 130 is provided in the enclosed space 110. One end of the traction member 130 is coupled to the elastic frame 100, and another end of the traction member 130 is coupled to the barrier 200. The traction member 130 may be arranged in the upper space 111, the lower space 113, or both the upper space 111 and the lower space 113. The traction member 130 provides a pulling force to maintain a relative position of the barrier 200 in the elastic frame 100. The traction member 130 is a plurality of rubber connectors. The rubber connectors have stable physical and chemical properties and will not react with the fluid filling. In addition, the rubber connectors can maintain their physical characteristics for a long period of time to provide the barrier 200 with a continuous and reliable pulling force to maintain the barrier 200 in the middle position of the elastic frame 100. Specifically, the rubber connectors can be made of materials such as polyurethane (PU), polyvinyl chloride (PVC), thermoplastic polyurethane (TPU), or other materials that do not react with the fluid filler and can provide a continuous pulling force to maintain the position of the barrier 200.

Specifically, the rubber connectors may be arranged side-by-side or radially in the upper space 111 and/or the lower space 113. A specific arrangement form is selected according to an arrangement of the circulation holes 210 on the barrier 200 and a thickness of the barrier 200 itself. The arrangement of the rubber connectors can effectively improve a uniformity of force of the rubber connectors in the enclosed space 110 and increase a service life of the barrier 200.

In other embodiments, when the traction member 130 is only provided in the lower space 113, the traction member 130 in the lower space 113 needs to provide pressure to the barrier 200, so that when the elastic frame 100 is suddenly stressed, the barrier 200 can be supported by the traction member 130.

In actual use, when a pressure is applied to the outside of the elastic frame 100, the elastic frame 100 will be deformed, and the fluid filling in the upper space 111 will be squeezed into the lower space 113. In general, the greater the flow damping between the upper space 111 and the lower space 113, the more difficult it is for the fluid filling in the upper space 111 to circulate and exchange with the lower space 113, and the hardness adjustment unit 010 has a greater hardness. In contrast, the smaller the flow damping between the upper space 111 and the lower space 113, the easier it is for the fluid filling in the upper space 111 to circulate and exchange with the lower space 113, and the hardness adjustment unit 010 has a lesser hardness. The adjustment of the flow damping between the upper space 111 and the lower space 113 is realized by changing the viscosity of the fluid filling, and the viscosity of the fluid filling is adjusted by the field generator 400. Therefore, by generating fields with different strengths and layouts through the field generator 400, the hardness of the hardness adjustment unit 010 when subjected to pressure can be adjusted.

The hardness adjustment unit 010 according to the first embodiment can control a deformation speed of the elastic frame 100 under pressure through the field generator 400, that is, control the external hardness of the hardness adjustment unit 010. The hardness adjustment unit 010 can adjust the hardness of the elastic frame 100 safely and quickly without causing damage to the object or person applying the pressure on the elastic frame 100.

Figure 3:
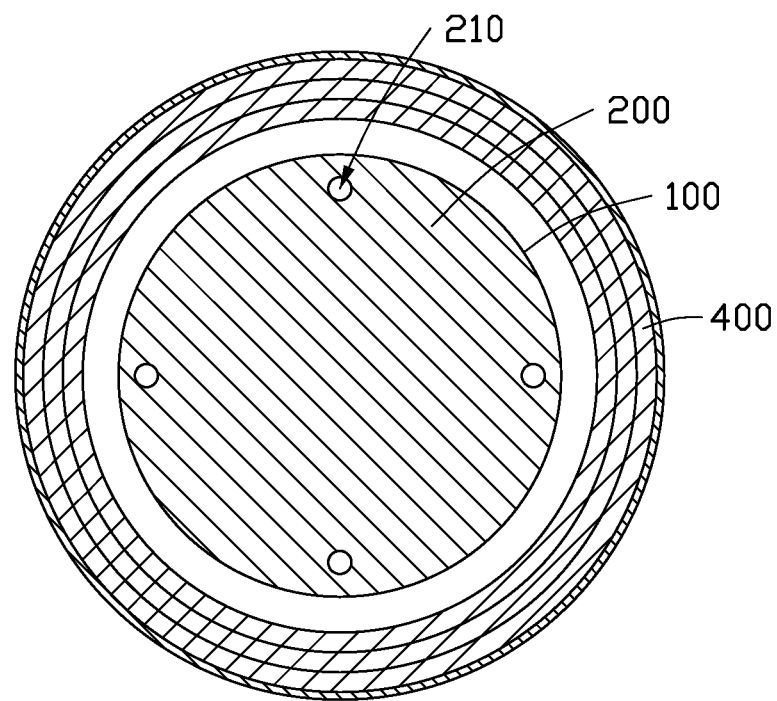
FIG. 3 is a top view of a hardness adjustment unit according to a second embodiment of the present disclosure.

FIG. 3 shows a second embodiment of the hardness adjustment unit 010 for adjusting the softness and hardness of a seat. The second embodiment differs from the first embodiment in that the field generator 400 is arranged as a ring-shaped magnetic field line surrounding the elastic frame 100. The ring-shaped magnetic field line can provide a uniform magnetic field to control the viscosity of the fluid filling. When there are more circulation holes 210 provided on the barrier 200, the ring-shaped magnetic field line can uniformly control the viscosity of the fluid filling in the entire enclosed space 110, thereby making the flow damping of each circulation hole 210 uniform and providing a better flow damping effect.

The hardness adjustment unit 010 according to the second embodiment can control a deformation speed of the elastic frame 100 under pressure through the field generator 400, that is, control the external hardness of the hardness adjustment unit 010. The hardness adjustment unit 010 can adjust the hardness of the elastic frame 100 safely and quickly without causing damage to the object or person applying the pressure on the elastic frame 100.

Figure 4:
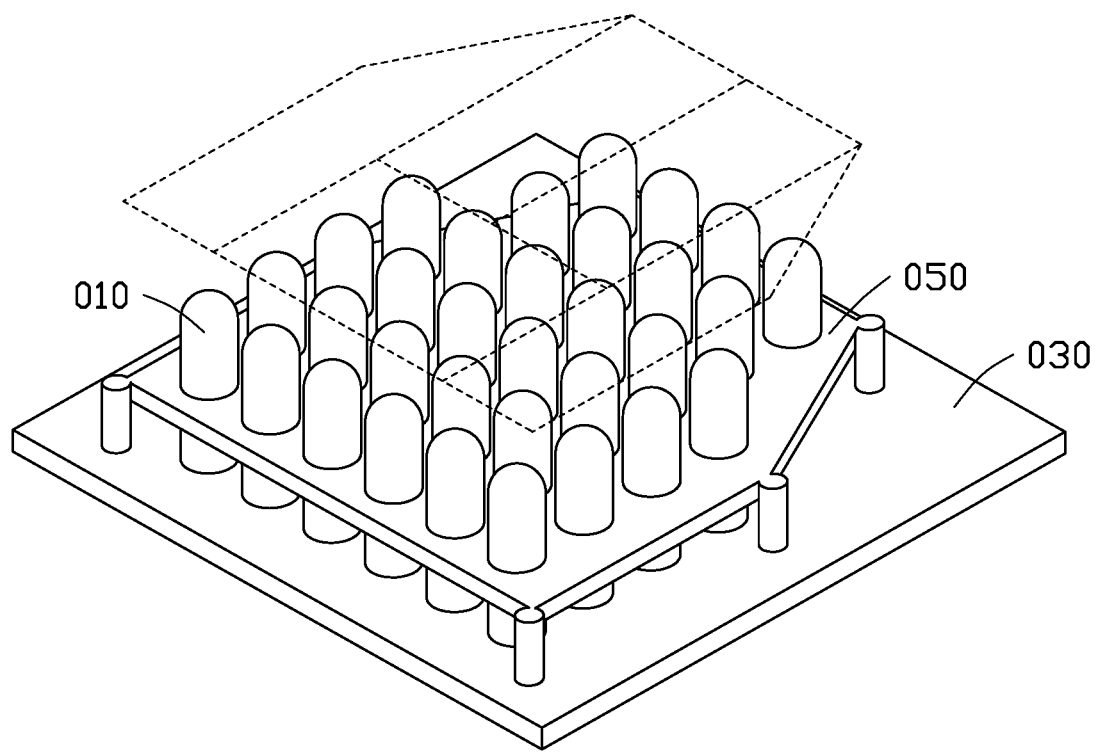
FIG. 4 is a schematic structural diagram of a seat according to a third embodiment of the present disclosure.

FIG. 4 shows a third embodiment of a seat for carrying a passenger in a vehicle. The seat includes a bottom plate 030 and a plurality of the hardness adjustment units 010 provided in the first embodiment.

The bottom plate 030 includes a mounting surface, and the hardness adjustment units 010 are arranged on the mounting surface of the bottom plate 030 in parallel.

The plurality of hardness adjustment units 010 can form different hardness distributions on the mounting surface to adapt to different driving conditions and different passenger needs.

Figure 5:
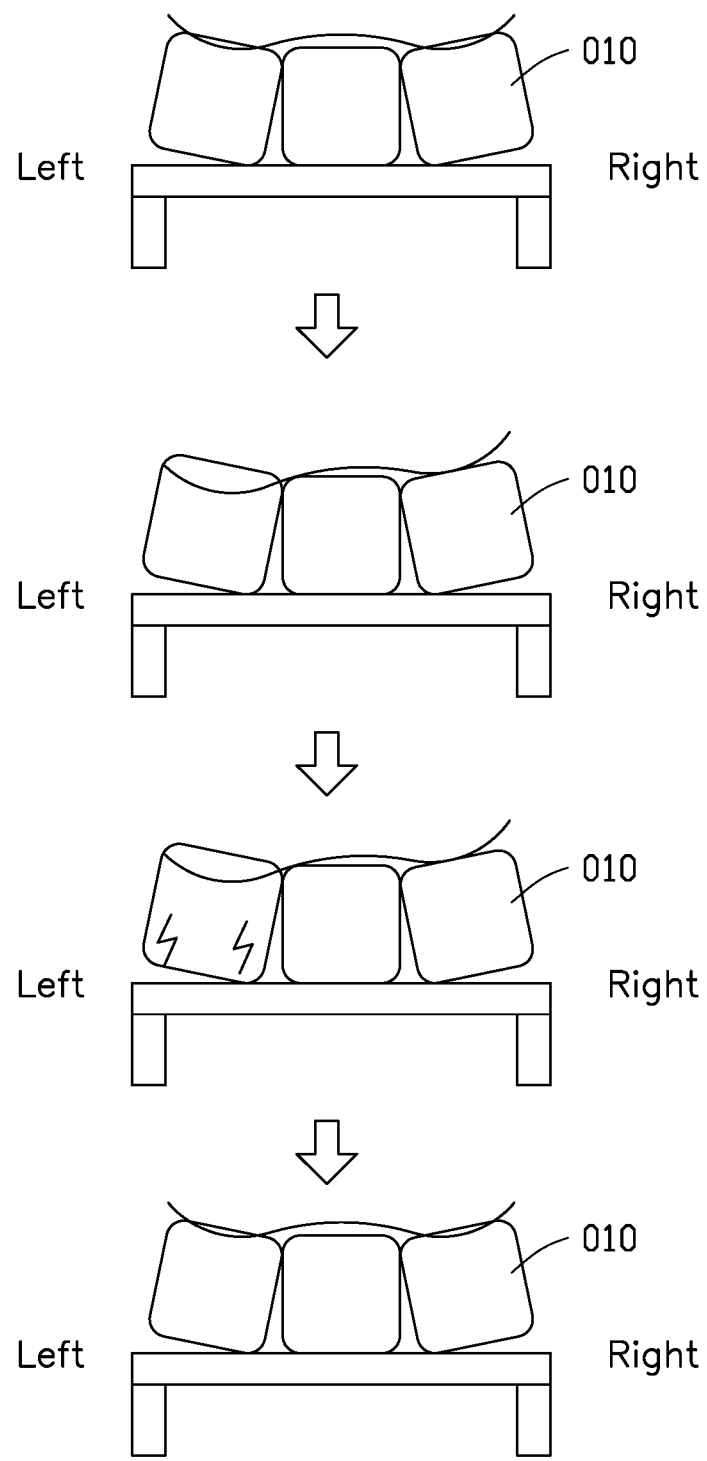
FIG. 5 is an adjustment process diagram of the seat in FIG. 4 when a vehicle turns right.

For example, referring to FIG. 5, when the vehicle turns right, a center of gravity of the passenger will tilt to the left side of the seat due to inertia. At this time, a hardness of the hardness adjustment units 010 on the left side of the mounting surface is increased from an original hardness to provide a stronger support to prevent the passenger from leaning further to the left, while the hardness of the hardness adjustment units 010 on the right side of the mounting surface is maintained. When the right turn is finished, the center of gravity of the passenger is centered, and the hardness of the hardness adjustment units 010 on the left side of the mounting surface is returned to the original hardness.

Figure 6:
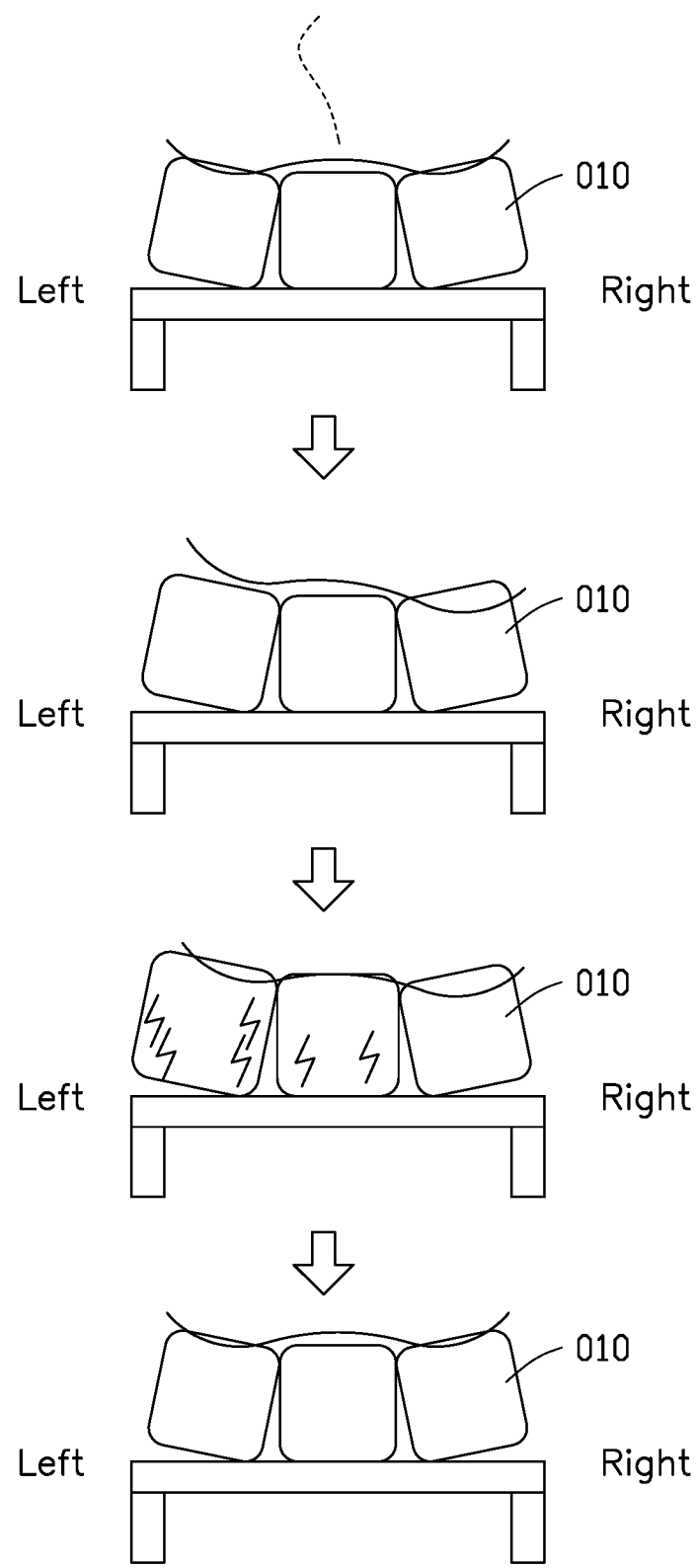
FIG. 6 is an adjustment process diagram of the seat when a passenger has scoliosis.

In another example, FIG. 6 shows a passenger with scoliosis sitting on the seat. If the passenger with scoliosis has a spine curving left and all the hardness adjustment units 010 on the mounting surface have the same hardness, the hardness adjustment units 010 on the left side of the mounting surface will be depressed more due to the passenger's center of gravity tilting left. Therefore, the hardness of the hardness adjustment units 010 on the left side and middle of the mounting surface is adjusted, so that the mounting surface has a hardness distribution that gradually becomes softer from left to right. Therefore, the center of gravity of the passenger can be maintained in a center position to reduce soreness of the passenger with scoliosis.

Positions of the plurality of hardness adjustment units 010 need to be relatively fixed when mounted on the mounting surface. Therefore, a fixing frame 050 is fixedly arranged on the mounting surface. The fixing frame 050 is provided with a plurality of positioning holes. In actual use, the hardness adjustment units 010 are inserted into the corresponding positioning holes. The field generator 400 of each hardness adjustment unit 010 can be embedded in the fixing frame 050, or can be mounted above or below the fixing frame 050.

In the seat of the third embodiment, the hardness of corresponding hardness adjustment units 010 can be quickly adjusted to form different hardness distributions on the mounting surface, so as to adapt to different driving conditions and different passenger needs.

Figure 7:
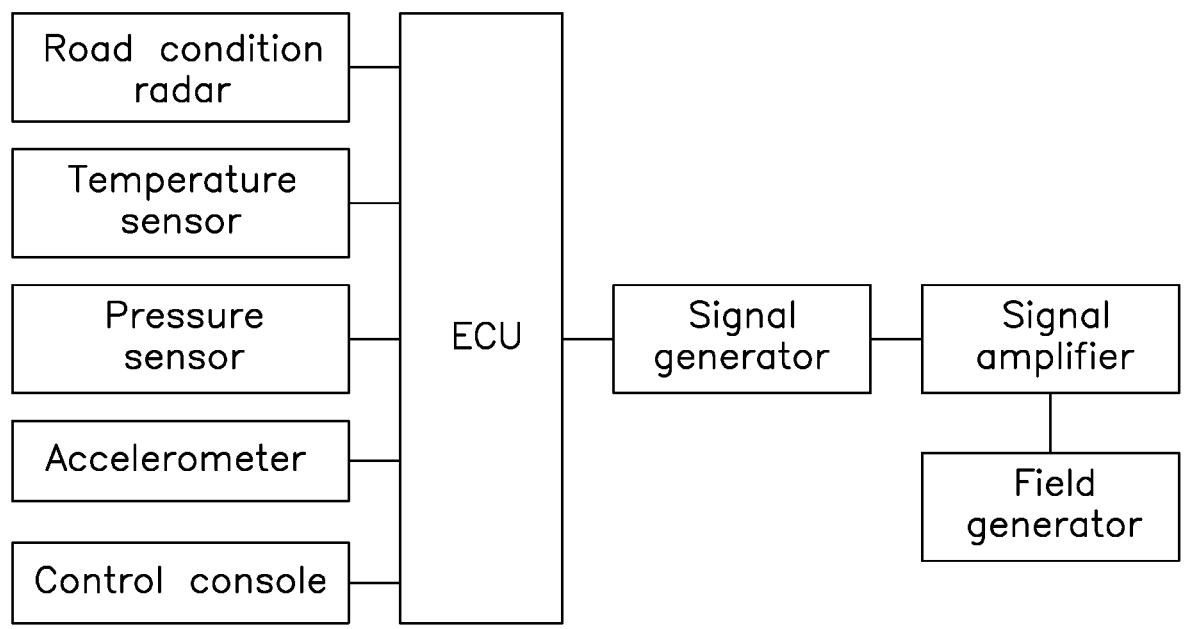
FIG. 7 is a block diagram of a seat adjustment system according to a fourth embodiment of the present disclosure.

FIG. 7 shows a fourth embodiment of a seat adjustment system for controlling a hardness of a seat. The seat adjustment system includes an electronic control unit (ECU) and the seat provided in the third embodiment.

The hardness adjustment units in the seat are electrically coupled to the ECU. A signal generator and a signal amplifier are provided between the ECU and the field generator of each hardness adjustment unit.

The hardness of the hardness adjustment units of the seat are controlled by the ECU.

In order for the ECU to automatically perform hardness adjustments according to environmental conditions, the seat adjustment system also includes a plurality of sensing devices electrically coupled to the ECU. The ECU receives environmental information through the sensing devices. After receiving the environmental information, the ECU analyzes working conditions of the field generators, and then controls the field generators to generate the required magnetic fields to control the hardness adjustment units in the seat to form a corresponding hardness distribution.

In one embodiment, the plurality of sensing devices includes a road condition radar, a temperature sensor, a pressure sensor, and an accelerometer.

The road condition radar is used to receive road condition information and transmit the road condition information to the ECU. When the road condition is relatively bumpy, the hardness of the hardness adjustment units can be appropriately reduced to buffer an impact of bumps on the passenger. The road condition radar can also sense left and right turns in advance, so that the hardness distribution of the seat can be adjusted in advance.

The temperature sensor is used to receive temperature information of the environment and transmit the temperature information to the ECU. The temperature sensor can determine a current viscosity of the magnetorheological fluid, so that the hardness adjustment by the ECU is more reasonable. The temperature sensor can also be used to adjust a temperature of the seat when the seat is provided with a heating pad.

The pressure sensor is used to receive pressure information of pressure on the elastic frame and transmit the pressure information to the ECU. The pressure sensor can sense a pressure distribution of a sitting posture of the passenger on the seat, and then through a pressure distribution of big data, the hardness distribution of the seat is adjusted to adjust the sitting posture of the passenger.

The accelerometer is used to receive acceleration information and transmit acceleration information to the ECU. When the vehicle turns left or right when changing lanes or when overtaking another vehicle, the acceleration of the vehicle can be sensed in real time through the accelerometer and converted into directional acceleration information, so that the hardness distribution of the seat is adjusted in real time. When the vehicle accelerates or decelerates, a front and rear hardness distribution of the seat can be adjusted for better comfort.

In addition to automatically adjusting the hardness distribution of the seat through the ECU, a passenger can also adjust the hardness of the seat manually according to a hardness preference. Therefore, a control console electrically coupled to the ECU is provided. The passenger can control the hardness distribution of the seat through the control console.

Through the seat adjustment system, the hardness distribution of the seat can be automatically adjusted through the ECU, thereby adapting to different driving conditions and different passenger needs.

In a fifth embodiment, a vehicle includes a vehicle body and the seat adjustment system provided in the fourth embodiment. The seat adjustment system is installed in the vehicle body. The vehicle can be a car, a train, a ship, an airplane, or any other vehicle requiring a seat.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A hardness adjustment unit comprising:
an elastic frame, an enclosed space provided inside the elastic frame and filled with a fluid filling;
a barrier arranged in the enclosed space, the barrier dividing the enclosed space into an upper space and a lower space, the upper space communicating with the lower space; and
a field generator arranged outside the elastic frame and used to apply a field to the fluid filling to adjust a viscosity of the fluid filling, thereby adjusting a flow damping of the fluid filling in the upper space and the lower space to control a deformation of the elastic frame;
wherein a traction member is provided in the enclosed space; and
one end of the traction member is coupled to the elastic frame, and another end of the traction member is coupled to the barrier to maintain a relative position between the barrier and the elastic frame.

2. The hardness adjustment unit of claim 1, wherein:
the barrier is provided with a plurality of circulation holes; and
the upper space communicates with the lower space through the plurality of circulation holes.

3. The hardness adjustment unit of claim 1, wherein:
the traction member is a plurality of rubber connecting members.

4. The hardness adjustment unit of claim 1, wherein:
the fluid filling is a magnetorheological fluid;
the field generator is ring-shaped and surrounds the elastic frame.

5. A seat comprising:
a bottom plate; and
a plurality of hardness adjustment units arranged in parallel on a surface of the bottom plate;
wherein each of the plurality of hardness adjustment units comprises:
an elastic frame, an enclosed space provided inside the elastic frame and filled with a fluid filling;
a barrier arranged in the enclosed space, the barrier dividing the enclosed space into an upper space and a lower space, the upper space communicating with the lower space; and
a field generator arranged outside the elastic frame and used to apply a field to the fluid filling to adjust a viscosity of the fluid filling, thereby adjusting a flow damping of the fluid filling in the upper space and the lower space to control a deformation of the elastic frame;
a traction member is provided in the enclosed space; and
one end of the traction member is coupled to the elastic frame, and another end of the traction member is coupled to the barrier to maintain a relative position between the barrier and the elastic frame.

6. The seat of claim 5, wherein:
the bottom plate is provided with a fixing frame; and
the fixing frame fixes a relative position of the plurality of hardness adjustment units on the bottom plate.

7. The seat of claim 5, wherein:
the barrier is provided with a plurality of circulation holes; and
the upper space communicates with the lower space through the plurality of circulation holes.

8. The seat of claim 5, wherein:
the traction member is a plurality of rubber connecting members.

9. The seat of claim 5, wherein:
the fluid filling is a magnetorheological fluid;
the field generator is ring-shaped and surrounds the elastic frame.

10. A seat adjustment system comprising:
an electronic control unit (ECU); and
a seat comprising a bottom plate and a plurality of hardness adjustment units mounted on the bottom plate; wherein:
each of the plurality of hardness adjustment units is electrically coupled to the ECU; and
the ECU adjusts a hardness of each of the plurality of hardness adjustment units to form a hardness distribution of the plurality of hardness adjustment units;
each of the plurality of hardness adjustment units comprises:
an elastic frame, an enclosed space provided inside the elastic frame and filled with a fluid filling;
a barrier arranged in the enclosed space, the barrier dividing the enclosed space into an upper space and a lower space, the upper space communicating with the lower space; and
a field generator arranged outside the elastic frame and used to apply a field to the fluid filling to adjust a viscosity of the fluid filling, thereby adjusting a flow damping of the fluid filling in the upper space and the lower space to control a deformation of the elastic frame;
a traction member is provided in the enclosed space; and
one end of the traction member is coupled to the elastic frame, and another end of the traction member is coupled to the barrier to maintain a relative position between the barrier and the elastic frame.

11. The seat adjustment system of claim 10, wherein:
the bottom plate is provided with a fixing frame; and
the fixing frame fixes a relative position of the plurality of hardness adjustment units on the bottom plate.

12. The seat adjustment system of claim 10, wherein:
the barrier is provided with a plurality of circulation holes; and
the upper space communicates with the lower space through the plurality of circulation holes.

13. The seat adjustment system of claim 10, further comprising a plurality of sensing devices, wherein:
each of the plurality of sensing devices is electrically coupled to the ECU;
each of the plurality of sensing devices receives environmental information and transmits the environmental information to the ECU; and
the ECU controls the field generators of the plurality of hardness adjustment units according to the environmental information.

14. The seat adjustment system of claim 13, wherein:
the plurality of sensing devices comprises at least one of a road condition radar, a temperature sensor, a pressure sensor, and an accelerometer;
the road condition radar is used to receive road condition information and transmit the road condition information to the ECU;
the temperature sensor is used to receive temperature information of the environment and transmit the temperature information to the ECU;
the pressure sensor is used to receive pressure information of pressure on the elastic frame and transmit the pressure information to the ECU; and
the accelerometer is used to receive acceleration information and transmit the acceleration information to the ECU.

15. The seat adjustment system of claim 14, further comprising a control console, wherein:
the control console is electrically coupled to the ECU; and
the control console is used to receive user input to control the field generators of the plurality of hardness adjustment units to adjust the hardness distribution.

* * * * *